United States Patent [19]

Lee et al.

[11] 4,388,542
[45] Jun. 14, 1983

[54] SOLAR DRIVEN LIQUID METAL MHD POWER GENERATOR

[76] Inventors: Alan M. Lovelace, Administrator of the National Aeronautics and Space Administration, with respect to an invention of Ja H. Lee; Frank Hohl, both of Newport News, Va.

[21] Appl. No.: 263,830

[22] Filed: May 15, 1981

[51] Int. Cl.³ .............................................. H02N 4/02
[52] U.S. Cl. ..................................................... 310/11
[58] Field of Search ...................... 310/11, 306; 60/641

[56] References Cited

U.S. PATENT DOCUMENTS

| | | | |
|---|---|---|---|
| 4,191,901 | 3/1980 | Branover | 310/11 |
| 4,200,815 | 4/1980 | Petrick et al. | 310/11 |
| 4,275,318 | 6/1981 | Duncan | 310/11 |
| 4,302,710 | 11/1981 | Menser et al. | 310/306 X |

*Primary Examiner*—Donovan F. Duggan
*Attorney, Agent, or Firm*—Howard J. Osborn; John R. Manning; William H. King

[57] ABSTRACT

A solar energy collector focuses solar energy onto a solar oven which is attached to a mixer which in turn is attached to the channel of a MHD generator. Gas enters the oven and a liquid metal enters the mixer. The gas/liquid metal mixture is heated by the collected solar energy and moves through the MHD generator thereby generating electrical power. The mixture is then separated and recycled.

10 Claims, 6 Drawing Figures

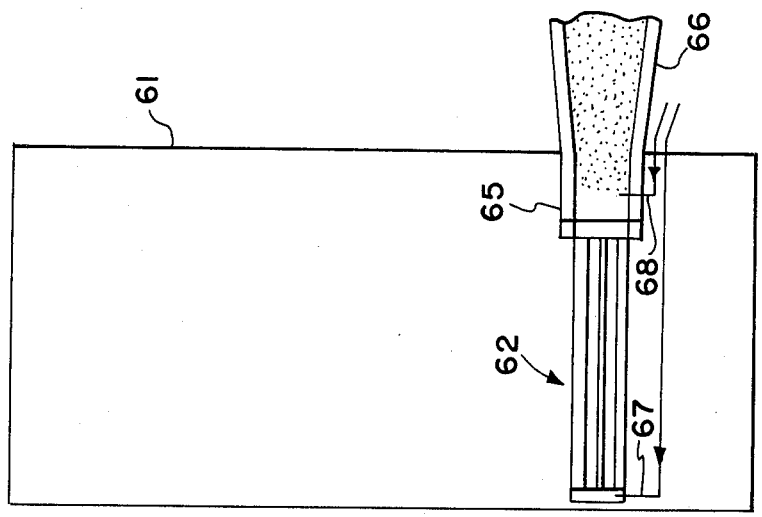
FIG. 5
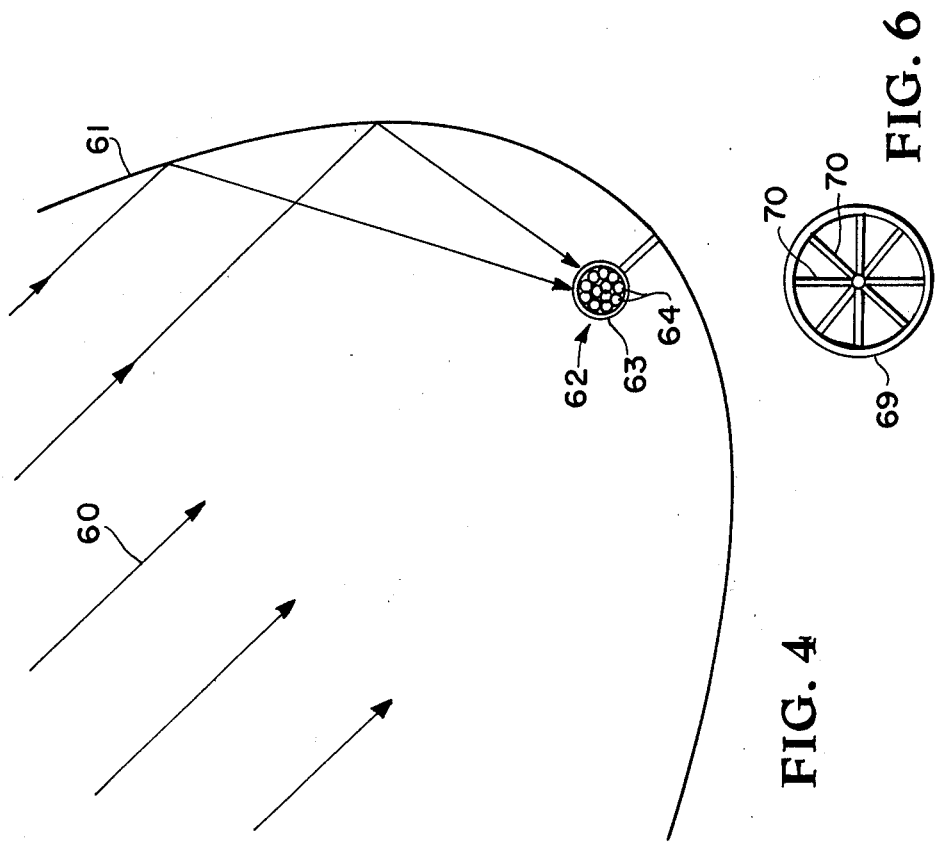
FIG. 6
FIG. 4

SOLAR DRIVEN LIQUID METAL MHD POWER GENERATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; USC 2457).

BACKGROUND OF THE INVENTION

The invention relates generally to the generating of electric power in space and more specifically concerns the generation of electric power from solar energy in space.

Prior methods of producing electric power from solar energy in space are classified as follows: photovoltaic (solar cells), thermoelectric, and plasma magnetohydrodynamic (MHD) generators. There also has been a proposal for a liquid metal magnetrohydrogynamic (LMMHD) generator driven by a nuclear reactor in space.

The photovoltaic generation of electric power has been utilized for many years with solar cells on various spacecraft. The efficiency of the solar cells has been improved considerably due to intensive research efforts. However, the solar cells are difficult to operate at temperatures greater than 200° C. due to sharp decreases of efficiency and useful life. Consequently, solar-cell panels require a large area, thus the unit cost for electric power from solar cells is very high. Also, the cost and technology required for lifting the large payload into earth orbit becomes prohibitive. For example, to produce 25 kW of electric power from solar cells with 10 percent efficiency, the effective area of the cells covers approximately 180 m². The electrical circuit for power collection also becomes a costly task for such a large but diffuse power source in space. Although improvements of efficiency and operating temperature for solar cells will reduce the difficulties somewhat, the demand for high power levels in space will undoubtedly increase in the future and the difficulties to satisfy this demand with solar cells will remain.

Thermal power production from solar radiation in space has been extensively investigated since this method requires minimal modifications of the well developed technology for conventional steam power plants on earth. However, the efficiency, typically less than 35 percent, of this method is limited by the rather low temperature (below 1000K) of steam generated with solar energy.

On the other hand, plasma MHD generators operated at temperatures greater than 2000K gives a high efficiency for electric power production. However, continuous operation at such high temperatures results in severe material problems yet to be solved. The maximum duty cycle tested for a high temperature plasma MHD lasted only a few days with coal gas as the working fluid.

A prior art liquid metal MHD generator (FIG. 1) was originally proposed as part of a space power system using a nuclear reactor. Two metals, cesium and lithium, were considered as the working fluids of the generator. The cesium (Cs), leaving a radiator 11 as a condensate, is pumped by a pump 12 through a regenerative heat exchager (not shown) to a nozzle 13 where it vaporizes as it comes in contact with the liquid metal, lithium (Li), from the liquid loop. The cesium accelerates the lithium in the nozzle, thus imparting an increased kinetic energy to the liquid lithium; the cesium is separated from the lithium in a separator 14 and then passes back to the radiator. The lithium leaves the separator at a relatively high velocity, approximately 150 m/s and flows through an MHD generator 15. The cooled Li is passed through a diffuser 16 and then reheated in a heat source (nuclear reactor) 17 and then pumped back to nozzle 13.

The disadvantages of this device—a fixed and high operating temperature range (>1400° C.) and the difficulty of handling of the liquid flow in the MHD channel; have been alleviated by the adoption of a two-phase generator cycle. The basic idea was to utilize the fact that a two-phase mixture is a compressible fluid and thus is an effective thermodynamic working fluid that could be expanded directly through the MHD generator like a gas expanding through a turbine from which electric power is extracted (FIG. 2). The mixture as it leaves the MHD generator 20 is further expanded in a nozzle 21 to increase its kinetic energy and is then sent to a separator 22. There the liquid metal is separated from the gas and is returned via a diffuser 23 through the heat source 24 to the mixer 25. The gaseous working fluid is then handled as in a normal Brayton cycle; it is passed through the regenerative heat exchanger 26 to the heat sink 27 and is then compressed by a compressor 28 and sent back to the mixer 25 via the heat source 24. A gas source 29 supplies the gas needed to startup and for replenishing the gas lost in the operation. The gaseous component is the thermodynamic working fluid, and the liquid metal, which remains in the closed liquid loop, is the electrodynamic working fluid. The heat sources considered by researchers for use with the LLMHD generator shown in FIG. 2 have been fossil combustion, high temperature gas cooled nuclear reactor (HTGCR), fusion reactors, and liquid metal fast breeder reactors.

It is an object of this invention to provide a means for generating electric power in space.

Another object of this invention is to provide a new means for generating electric power from solar energy.

A further object of this invention is to utilize solar heat as the heat source for MHD generators.

Still another object of this invention is to provide a solar driven LMMHD generator.

Other objects and advantages of this invention will become apparent hereinafter in the specification and drawings.

SUMMARY OF THE INVENTION

The invention is a solar driven MHD power generator. It consists essentially of a large solar collector, an oven heated by solar energy, a mixer for mixing a gas and a liquid metal, a MHD generator including a magnet, inverters and a power transmission circuit, a gas/liquid metal separator, a pump for supplying and recycling the working gas, and a radiator for cooling the gas. In a first embodiment of the invention, suitable for use in space, the oven is in the shape of a frustum of a cone with a transparent window covering the large end with the small end attached to the mixer. The collected solar energy is focused through the window and through the oven to the mixer where the liquid metal is injected. The gas is injected into the solar oven near the window. Consequently, the gas/liquid metal mixture is heated directly by the collected solar energy. The separator is a centrifugal separator. In a second embodiment of the invention, suitable for use on earth, the oven is a large transparent tube containing many heat exchanging elements. Each heat exchanging element is a small tube containing radial fibers of graphite. The solar oven has one of its ends closed with the other end attached to the mixer. The gas enters the oven at its closed end and the liquid metal enters the mixer. The collected solar energy is focused onto the solar oven throughout its length. Hence, the solar energy heats the gas directly which in turn heats the liquid metal.

BRIEF DESCRIPTION OF THE DRAWINGS

FIGS. 4-6 are schematic drawings of an alternate embodiment of the invention.

DETAILED DESCRIPTION OF THE INVENTION

Figure 1:
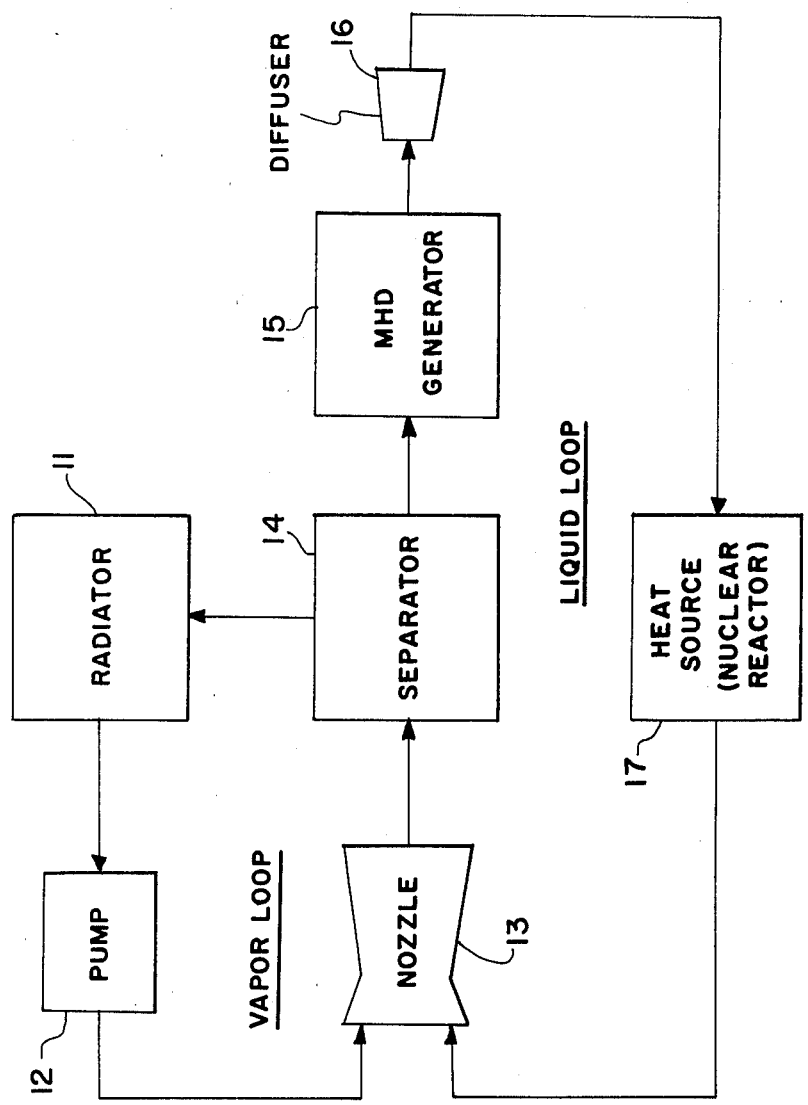
FIG. 1 is a block diagram of a prior art liquid-metal MHD generator system.
Figure 2:
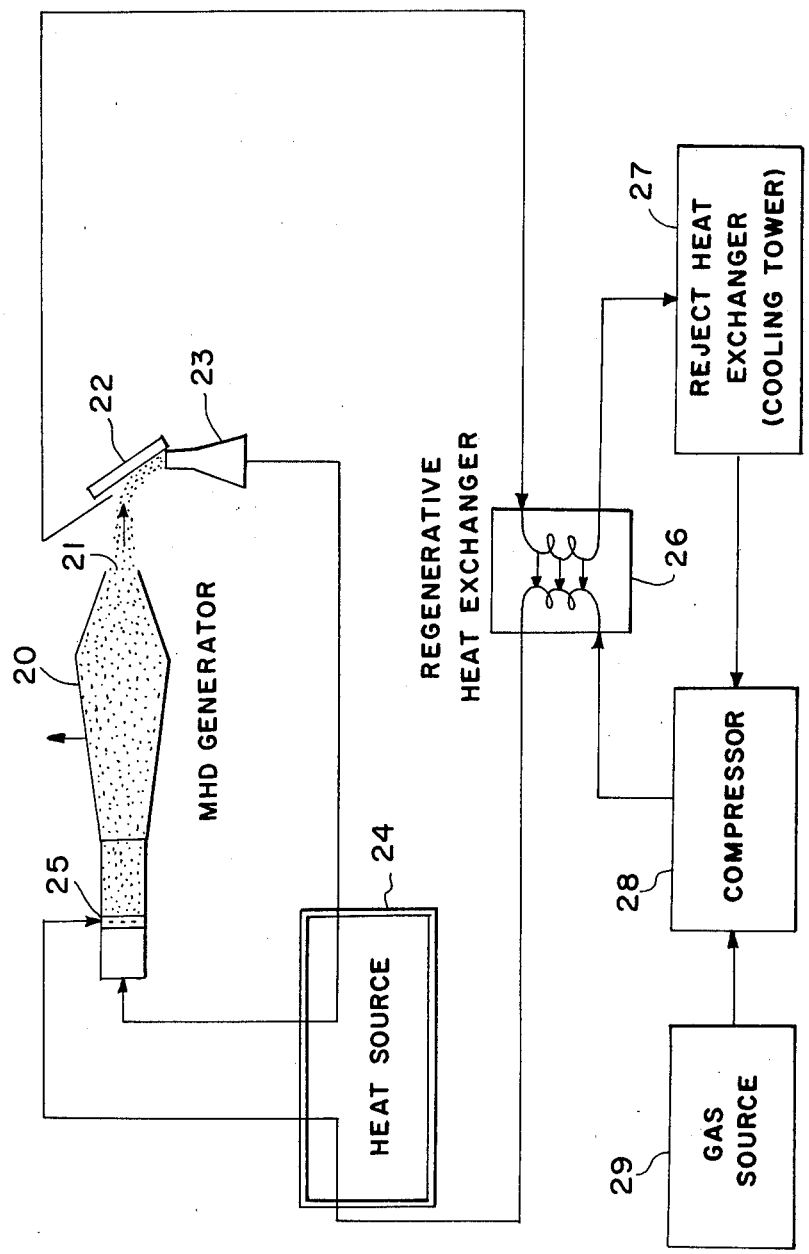
FIG. 2 is a block diagram of a prior art two-phase MHD generator cycle.
Figure 3:
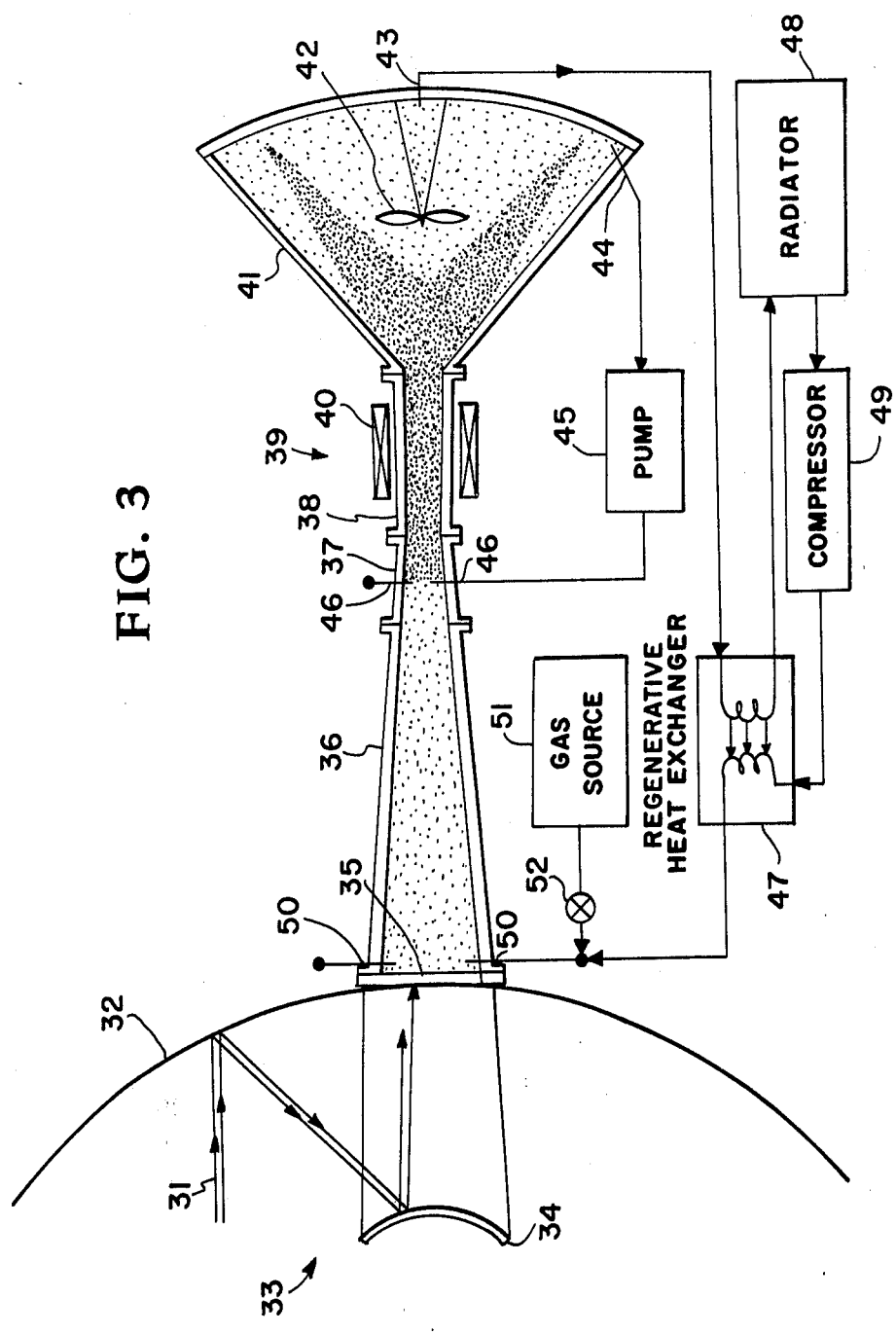
FIG. 3 is a schematic drawing of a preferred embodiment of the present invention.

Turning now to the embodiment of the invention selected for illustration in the drawings, the number 31 in FIG. 3 designates sunlight photons that are collected by the large reflector 32 of a solar collector 33. The collected photons are reflected to the focusing mirror 34 of solar collector 33. The photons that are reflected to focusing mirror 34 are focused onto a circulating opening through reflector 32 which is covered by a transparent window 35. A solar oven 36 in the shape of the frustrum of a cone is attached to and covers window 35. The walls of solar oven 36 are made of rings of reflective material (for example, stainless steel) which can withstand a temperature greater than 1000K. The taper of the inside surface of the solar oven fits the taper of the focus of the photons reflected by focusing mirror 34. A mixer 37 having the same taper as solar oven 36 is attached to the solar oven. The channel 38 of a MHD generator 39 is attached to mixer 37. MHD generator 39 includes a magnet 40 and a power conditioning unit that is not shown. A centrifugal gas/liquid-metal separator/diffuser 41 including a fan 42 is attached to the output of channel 38.

The centrifugal separator 41 separates the gas (one of the noble gases such as helium or argon) from the liquid metal (lithium or cesium) that passes through channel 38 of MHD generator 39. The separated gas is at output 43 and the separated liquid metal is at output 44. The liquid metal at output 44 is pumped by a pump 45 to mixer 37 where it is radially injected into the mixer by several nozzles 46. The gas at output 43 passes through a regenerative heat exchanger 47 to a radiator 48. The gas then passes through a compressor 49 and back through heat exchanger 47 to the solar oven 36 where it is radially injected into the oven close to window 35 by means of several nozzles 50. A gas source 51 and a valve 52 is available to supply the gas for startup of the system. Thermally insulated pipe is used for returning the working fluids to the solar oven and mixer.

The operation of the embodiment of the invention shown in FIG. 3 is as follows. The sunlight photons 31 are collected by the large area 32 of the solar collector 33 and are reflected to the focusing mirror 34. The focused photons are transmitted through transparent window 35 to the solar oven 36. The window is constantly cooled and maintained clean by the radial flow of the working gas flowing through nozzles 50. The working gas molecules partially absorb the photons while they flow through the conical volume of the solar oven 36 in which heating and compression of the gas takes place. The liquid metal injected through nozzles 46 is also heated in the solar oven. The liquid metal and the driving gas are mixed in the mixer 37 where the solar energy is focused to the minimum area, thus the two phase working fluid is heated to the maximum temperature.

The two phase fluid, mixed by the mixer at the entrance, flows through the MHD channel 38 of the generator 39. The MHD channel acts as a turbine and electric generator in one unit; the gas drives the liquid across the magnetic field created by magnet 40, and thus generates electrical power. Since the liquid has a high heat capacity expansion occurs at almost constant temperature and provides available energy in the gas exhausting the MHD generator. The liquid acts as a large heat source for the gas and thermal energy is continuously exchanged from the liquid to the gas and most of the enthalpy change in the generator depends on the liquid. The gas is separated from the mixture in the separator/diffuser 41 and is recouped in the regenerative heat exchanger 47. The gas is then returned to the solar oven 36 by way of the radiator 48 and compressor 49. The liquid metal is returned to the mixer by pump 45. This completes the cycle and the gas and liquid metal are recycled in the system.

In an alternative embodiment of the invention shown in FIGS. 4-6, sunlight photons 60 are reflected by a parabolic reflector 61 onto a solar oven 62. FIG. 4 is a view of the reflector and oven in one direction and FIG. 5 is a sectional view of the reflector and oven in a perpendicular direction. The solar oven is attached to a mixer 65 which is in turn attached to a channel 66 of a MHD generator. The gas enters the solar oven 62 through nozzles 67 and the liquid metal enters the mixer 65 through nozzles 68. All other parts of the invention are like those disclosed in FIG. 3.

The solar oven 62 includes an outside fused silica tube 63 filled with many small heat exchanging elements 64. Each heat exchanging element as shown in FIG. 6 includes an outside fused silicon tube 69 filled with multiple radial fins 70 made from graphite or other solar radiation absorbing material. The fins 70 are in the order of or less than one millimeter in diameter. The remainder of the system is like that shown in FIG. 3.

In operation the sunlight photons 60 are directed by reflector 61 into heat exchanging elements 64 where they are absorbed by fins 70. The gas in the system flows into solar oven 62 through nozzles 67 and the liquid metal flows into mixer 65 where it is mixed with the gas that is heated by the energy stored in the fins in the solar oven.

An alternative cycle that may be considered is a Rankin cycle LMMHD generator. In this cycle two types of liquid metal are used as the working fluids. The liquid metal with the lower boiling point is vaporized in the solar oven and is used as the dynamic fluid which is condensed in the radiator and is returned to the liquid phase before it is pumped back to the solar oven through the regenerative heat exchanger. The other liquid metal with the higher boiling point remains in the liquid phase throughout the cycle and acts as the electroconductive fluid in the MHD generator.

The systems described above can easily be modified for applications on earth. The solar collector may be installed on a Gimbal mechanism to track the sun continuously. Alternatively, a solar tower with a large number of mirrors on the ground may be used to provide energy to the solar oven. Numerous alternate solar collectors with a high concentration ratio now under development could also be utilized.

Advantages of the invention over prior art are numerous. Abundant solar energy available in space is utilized in the invention while the prior art considered a nuclear reactor to drive a liquid metal MHD generator. As a result, significant capital and payload savings are expected for the invention since the lighter solar collector replaces the bulky nuclear reactor. A high efficiency results from the invention compared with the prior art such as solar cells and thermoelectric power generation in space. An efficiency of up to 55% could be achieved by the invention. Near term application can be expected for the invention while the prior art, the plasma MHD generators, require breakthrough in materials and component development. This is because the invention is operated at lower (1000K) temperatures from the prior art at greater than 2,000K, thus alleviating the materials problems. The invention can be constructed with materials for which thermal characteristics are well known.

What is claimed is:

1. A solar driven magnetohydrodynamic (MHD) power generator that utilizes the flow of a gas and liquid-metal mixture through the channel of the MHD generator to generate electrical power comprising:
   means including a mixer having a channel for mixing the gas and liquid metal and for providing a flow of the mixture from the channel of the mixer through the channel of said MHD generator;
   means for collecting solar energy;
   means for focusing the collected solar energy onto the gas and liquid metal mixture inside the channel of said mixer to heat said gas and liquid metal mixture before it passes through the channel of said MHD generator;
   means for separating the gas from the liquid metal after it passes through the channel of said MHD generator; and
   means for returning the separated gas and liquid metal back to said mixing means.

2. A solar driven MHD power generator according to claim 1 wherein said means for focusing the collected solar energy onto said liquid metal mixture inside the channel of said mixer to heat said gas and liquid metal mixture comprises:
   a solar oven with first and second openings at its two ends, with a channel extending between the two openings, and with the second opening attached to said mixer such that the channel of said solar oven extends through the channel of said mixer and said MHD generator;
   a transparent window covering said first opening in said solar oven; and
   means for focusing said collected solar energy through said transparent window and through the channel of said solar oven into the channel of said mixer to heat said gas and liquid metal mixture.

3. A solar driven MHD power generator according to claim 2 wherein said gas is injected into said solar oven near said window and said liquid metal is injected into said mixer.

4. A solar driven MHD power generator according to claim 3 wherein said first opening is larger than said second opening such that the opening in any cross-section of said solar oven is equal to the cross-section of the focused solar energy at that point.

5. A solar driven MHD power generator according to claim 4 wherein the slope of the inside surface of said mixer matches the slope of the inside surface of said solar oven such that the cross-section of said mixer where said liquid metal is injected is equal to the cross-section of said focused solar energy at that point.

6. A solar driven magnetohydrodynamic power (MHD) generator that utilizes the flow of a gas and liquid-metal mixture through the channel of the MHD generator to generate electrical power comprising:
   means including a mixer having a channel for mixing the gas and liquid metal and for providing a flow of the mixture through the channel of said MHD generator;
   means for collecting solar energy;
   means for utilizing the collected solar energy to heat said gas and liquid metal mixture before it passes through the channel of said MHD generator;
   said means for utilizing the collected solar energy including a solar oven comprising a large transparent tube with a channel filled with many heat exchanging elements, the solar oven being attached to said mixer such that the channel in said tube extends through the channel in said mixer and the channel in said MHD generator;
   means for separating the gas from the liquid metal after it passes through the channel of said MHD generator; and
   means for returning the separated gas and liquid metal back to said mixing means.

7. A solar driven power generator according to claim 6 wherein said means for collecting solar energy includes means for applying the collected solar energy directly to said transparent tube throughout the length of said transparent tube.

8. A solar driven MHD power generator according to claim 7 wherein each of said heat exchanging elements includes a small transparent tube with a solar radiation absorbing material contained therein.

9. A solar driven MHD power generator according to claim 8 wherein said solar radiation absorbing material consists of radial fins of the solar radiation absorbing material.

10. A solar driven MHD power generator according to claim 9 wherein said gas is injected into said large transparent tube near its end away from said mixer and said liquid metal is injected into said mixer.

* * * * *